(12) United States Patent
Wei et al.

(10) Patent No.: US 12,461,420 B2
(45) Date of Patent: Nov. 4, 2025

(54) DISPLAY MODULE AND DISPLAY DEVICE

(71) Applicant: HKC CORPORATION LIMITED, Shenzhen (CN)

(72) Inventors: Guangping Wei, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/815,846

(22) Filed: Aug. 27, 2024

(65) Prior Publication Data

US 2025/0076726 A1    Mar. 6, 2025

(30) Foreign Application Priority Data

Aug. 31, 2023   (CN) .......................... 202311136049.5

(51) Int. Cl.
*G09G 3/3208*  (2016.01)
*G02F 1/1685*  (2019.01)
(Continued)

(52) U.S. Cl.
CPC ............ *G02F 1/1685* (2019.01); *G06F 21/84* (2013.01); *G09G 3/3208* (2013.01); *H10K 59/50* (2023.02);
(Continued)

(58) Field of Classification Search
CPC ...... H10K 59/50; G06F 21/84; G09G 3/3208; G02B 26/02
See application file for complete search history.

(56) References Cited

U.S. PATENT DOCUMENTS 12,007,553 B1 * 6/2024 Yang ................. G02F 1/133514
2016/0341654 A1 * 11/2016 Sieracki ................. G02B 21/36
(Continued)

FOREIGN PATENT DOCUMENTS

CN         106876331 A      6/2017
CN         107531003 B     12/2020
(Continued)

OTHER PUBLICATIONS

Chinese Rejection decision, Chinese Application No. 202311136049.5, mailed Apr. 27, 2025 (19 pages).
(Continued)

*Primary Examiner* — Kevin M Nguyen (57) ABSTRACT

A display module includes: an anti-peeping assembly and a display assembly. The anti-peeping assembly includes a substrate, a first driving circuit layer and a base layer sequentially laminated. The display assembly includes a light-emitting layer disposed on a side of the base layer away from the substrate. The light-emitting layer includes a plurality of pixel units spaced apart from each other. The base layer is arranged with an anti-peeping channel at a position corresponding to a region between two adjacent pixel units, and the anti-peeping channel extends through the base layer and the display assembly. The anti-peeping assembly further includes a first electromagnet and a black magnetic member arranged in the anti-peeping channel. The first driving circuit layer applies a current signal to the first electromagnet to control the black magnetic member to move in the anti-peeping channel in order to control a viewing angle of the display module.

14 Claims, 5 Drawing Sheets

(51) Int. Cl.
   *G06F 21/84* (2013.01)
   *H10K 59/50* (2023.01)
   *H10K 59/122* (2023.01)
   *H10K 59/173* (2023.01)

(52) U.S. Cl.
   CPC ............... *G09G 2320/0233* (2013.01); *G09G 2320/028* (2013.01); *H10K 59/122* (2023.02); *H10K 59/173* (2023.02)

(56) References Cited

U.S. PATENT DOCUMENTS

| | | | |
|---|---|---|---|
| 2021/0033899 A1* | 2/2021 | Chang | G02F 1/1335 |
| 2023/0205038 A1 | 6/2023 | Choi et al. | |
| 2023/0205041 A1 | 6/2023 | Lee et al. | |

FOREIGN PATENT DOCUMENTS

| | | | |
|---|---|---|---|
| CN | 113611811 | A | 11/2021 |
| CN | 113745209 | A | 12/2021 |
| CN | 115368777 | A | 11/2022 |
| CN | 115657349 | B | 3/2023 |
| CN | 116482887 | A | 7/2023 |
| CN | 116500821 | A | 7/2023 |
| CN | 116540466 | A | 8/2023 |
| FR | 2664728 | A1 | 1/1992 |
| KR | 200445670 | Y1 | 8/2009 |
| KR | 20210066327 | A | 6/2021 |
| WO | 2017070106 | A1 | 4/2017 |
| WO | 2019140768 | A1 | 7/2019 |
| WO | 2022252764 | A1 | 12/2022 |

OTHER PUBLICATIONS

Chinese First Office Action, Chinese Application No. 202311136049.5, mailed Jun. 1, 2024 (21 pages).
Chinese Third Office Action, Chinese Application No. 202311136049.5, mailed Dec. 20, 2024 (14 pages).
Chinese Second Office Action, Chinese Application No. 202311136049.5, mailed Sep. 13, 2024 (10 pages).

* cited by examiner

DISPLAY MODULE AND DISPLAY DEVICE

CROSS REFERENCE TO RELATED APPLICATIONS

The present application claims the priority of the Chinese patent application No. 202311136049.5, filed on Aug. 31, 2023, and contents of which are incorporated herein by its entireties.

TECHNICAL FIELD

The present disclosure relates to the field of display, and in particular to a display module and a display device.

BACKGROUND

As the society develops, an ordinary display screen can no longer meet demands of people in various environmental conditions. For example, when people need to do something private, people may desire the ordinary display to display information in only a front viewing angle. The information may not be viewed from an up viewing angle, a down viewing angle, a left viewing angle, a right viewing angle, and viewing angles from other sides of the display screen, such that the privacy is protected.

In the art, various anti-peeping displaying technologies are available. For one of the various anti-peeping displaying technologies, structural configuration inside a display panel or structural configuration of a backlight module may be changed. For example, an anti-peeping film or a grating may be attached. Alternate, a lens structure that concentrates light is arranged at a light source. However, the above anti-peeping technology cannot achieve conversion between a shared viewing state and an anti-peeping state, and therefore, the above anti-peeping technology is applied limitedly. For another one of the various anti-peeping displaying technologies, the conversion between the shared viewing state and the anti-peeping state can be achieved. For example, PDLC liquid crystal is used to make dual-cells. According to the nature of the PDLC liquid crystal being transparent when being electrically conducted and being scattering when being electrically disconnected, the conversion between the shared viewing state and the anti-peeping state of the display screen is achieved. However, for all of the above technologies, an anti-peeping film layer is arranged on a front side of the display panel, such that a certain brightness is lost.

SUMMARY OF THE DISCLOSURE

The present disclosure provides a display module and a display device to solve the problem that the displaying brightness of the display panel cannot be ensured while the display panel is switched between the shared viewing state and the anti-peeping state.

In a first aspect, the present disclosure provides a display module, including: an anti-peeping assembly, comprising: a substrate, a first driving circuit layer, and a base layer that are sequentially laminated; a display assembly, comprising: a second driving circuit layer, a pixel defining layer, a first electrode layer, a light-emitting layer, and a second electrode layer that are sequentially disposed on a side of the base layer away from the substrate; wherein, the light-emitting layer comprises a plurality of pixel units that are spaced apart from each other.

An anti-peeping channel is arranged on the base layer at least at a position corresponding to a region between two adjacent pixel units of a portion of the plurality of pixel units, the anti-peeping channel extends through the base layer and the display assembly.

The anti-peeping assembly further comprises a first electromagnet and a black magnetic member, the first electromagnet is arranged in the anti-peeping channel and is electrically connected to the first driving circuit layer, the first driving circuit layer is configured to apply a current signal to the first electromagnet.

The black magnetic member is arranged in the anti-peeping channel and is configured to move, based on the current signal, in the anti-peeping channel to control a viewing angle of the display module.

In some embodiments, the display module further comprises an encapsulation layer and a cover plate, the encapsulation layer is disposed on a side of the second electrode layer away from the light-emitting layer; the cover plate is disposed on a side of the encapsulation layer away from the second electrode layer; an end of the anti-peeping channel away from the first driving circuit layer extends to reach the surface of the encapsulation layer away from the second electrode layer; the first electromagnet is disposed on a surface of the first driving circuit layer near the base layer.

The black magnetic member is configured to be attracted, in response to the first driving circuit layer applying the first current signal to the first electromagnet, to the first electromagnet to be disposed in a portion of the anti-peeping channel corresponding to the base layer to enable light emitted from the pixel units to be fully exposed; and the black magnetic member is configured to be repelled, in response to the first driving circuit layer applying a second current signal to the first electromagnet, by the first electromagnet to move toward a portion of the anti-peeping channel corresponding to the display assembly to block at least a portion of the light emitted from the pixel units.

In some embodiments, the display module further comprises a second electromagnet, the second electromagnet is arranged in the anti-peeping channel, the second electromagnet is disposed corresponding to the first electromagnet and on a surface of the cover plate near the encapsulation layer.

In response to the first driving circuit layer applying the first current signal to the first electromagnet, the black magnetic member is configured to be attracted to the first electromagnet and repelled by the second electromagnet to be disposed in the portion of the anti-peeping channel corresponding to the base layer to enable the light emitted from the pixel units to be fully exposed; and in response to the first driving circuit layer applying the second current signal to the first electromagnet, the black magnetic member is configured to be repelled by the first electromagnet and attracted by the second electromagnet to move toward the portion of the anti-peeping channel corresponding to the display assembly to block at least a portion of the light emitted from the pixel units.

In some embodiments, a first limiting member is arranged on a channel sidewall of the anti-peeping channel, the first limiting member is disposed at the portion of the anti-peeping channel corresponding to the base layer; a second limiting member is arranged on an end of the black magnetic member near the substrate. The black magnetic member moves in a direction approaching the cover plate, the first limiting member is configured to be in contact with and mated with the second limiting member to limit the end of the black magnetic member near the substrate to be located in the portion of the anti-peeping channel corresponding to the base layer.

In some embodiments, the anti-peeping channel is filled with a lubricating fluid, the lubricating fluid is hydrophobic and insulating.

The display module further comprises an edge sealing adhesive, the edge sealing adhesive is disposed between the cover plate and the substrate, two ends of the edge sealing adhesive are connected to the cover plate and the substrate respectively, the edge sealing adhesive is disposed along a circumferential direction of the display module, and the edge sealing adhesive is hydrophobic.

In some embodiments, a plurality of support walls are arranged on a surface of the encapsulation layer near the cover plate and are spaced apart from each other, the plurality of support walls are in contact with the cover plate; each support wall is misaligned with the anti-peeping channel. The lubricating fluid is further filled between two adjacent support walls of the plurality of support walls and between the support walls and the edge sealing adhesive, the lubricating fluid is hydrophobic and insulating.

In some embodiments, in a first direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

Alternatively, in a second direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

Alternatively, in a first direction and in a second direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

In some embodiments, the display module comprises a plurality of pixel regions that are spaced apart from each other, each pixel region comprises more than one pixel units of the plurality of pixel units, the more than one pixel units are spaced apart from each other; the anti-peeping channel on the base layer is located at a position corresponding to a region between two adjacent pixel regions, one first electromagnet and one black magnetic member are arranged in each anti-peeping channel.

In some embodiments, the black magnetic member is in columnar, the black magnetic member is a black permanent magnet.

The first driving circuit layer is configured to apply the current signal to each first electromagnet independently to independently control each black magnetic member to move in the anti-peeping channel according to the corresponding current signal.

In a second aspect, the present disclosure provides a display device, including the display module according to any of the above embodiments.

According to the present disclosure, a display module and a display device are provided. The display module includes: an anti-peeping assembly and a display assembly. The anti-peeping assembly includes a substrate, a first driving circuit layer and a base layer that are sequentially laminated. The display assembly includes a second driving circuit layer, a pixel defining layer, a first electrode layer, a light-emitting layer, and a second electrode layer, which are disposed on a side of the base layer away from the substrate. The light-emitting layer includes a plurality of pixel units that are spaced apart from each other. The base layer is arranged with an anti-peeping channel at a position corresponding to a region between two adjacent pixel units of a portion of the plurality of pixel units, and the anti-peeping channel extends through the base layer and the display assembly. The anti-peeping assembly further includes a first electromagnet and a black magnetic member. The first electromagnet is arranged in the anti-peeping channel and is electrically connected to the first driving circuit layer. The first driving circuit layer is configured to apply a current signal to the first electromagnet. The black magnetic member is arranged in the anti-peeping channel and is configured to move in the anti-peeping channel based on the current signal in order to control a viewing angle of the display module. According to the above configuration, the display module achieves the conversion between the shared viewing state and the anti-peeping state, and the anti-peeping film layer can be omitted from the front side of the display module, ensuring displaying brightness.

BRIEF DESCRIPTION OF THE DRAWINGS

In order to more clearly illustrate the technical solutions in the embodiments of the present disclosure or in the art, the accompanying drawings for describing the embodiments of the present disclosure or in the art will be briefly introduced in the following. Obviously, the following accompanying drawings show only some of the embodiments of the present disclosure, and any ordinary skilled person in the art may obtain other accompanying drawings based on the following drawings without making any creative work.

REFERENCE NUMERALS IN THE DRAWINGS display module 100; anti-peeping assembly 1; substrate 11; first driving circuit layer 12; base layer 13; first limiting member 131; anti-peeping channel 14; first electromagnet 15; black magnetic member 16; second limiting member 161; second electromagnet 17; display assembly 2; second driving circuit layer 21; pixel defining layer 22; first electrode layer 23; second electrode layer 25; light-emitting layer 24; pixel unit 241; encapsulation layer 26; support wall 261; cover plate 27; edge sealing adhesive 28; first direction A1; second direction A2; pixel region S; display device 200.

DETAILED DESCRIPTION

The technical solutions in the embodiments of the present disclosure will be described clearly and completely in the following by referring to the accompanying drawings in the embodiments of the present disclosure. Obviously, the described embodiments show only a part of, not all of, the embodiments of the present disclosure. All other embodiments, which are obtained by any ordinary skilled person in the art based on the embodiments of the present disclosure without making creative work, shall fall within the scope of the present disclosure.

The terms "first", "second", and "third" in the embodiments of the present disclosure are used for descriptive purposes only and shall not be interpreted as indicating or implying relative importance or implicitly specifying the number of technical features indicated. Therefore, a feature defined by "first", "second", "third" may explicitly or implicitly include at least one such feature. In the present disclosure, "plurality" means at least two, such as two, three, and so on, unless otherwise expressly and specifically limited. In addition, the terms "include", "have", and any variations thereof, are intended to cover non-exclusive inclusion. For example, a process, a method, a system, a product or a device including a series of steps or units is not limited to the listed steps or units, but may further include steps or units that are not listed or other steps or units that are inherently included in the process, the method, the system, the product or the device.

The "embodiment" herein implies that particular features, structures, or properties described in an embodiment may be included in at least one embodiment of the present disclosure. The presence of the term at various sections in the specification does not necessarily refer to a same embodiment, nor a separate or an alternative embodiment that is mutually exclusive of other embodiments. Any ordinary skilled person in the art shall understand explicitly and implicitly that the embodiments described herein may be combined with other embodiments.

Figure 1:
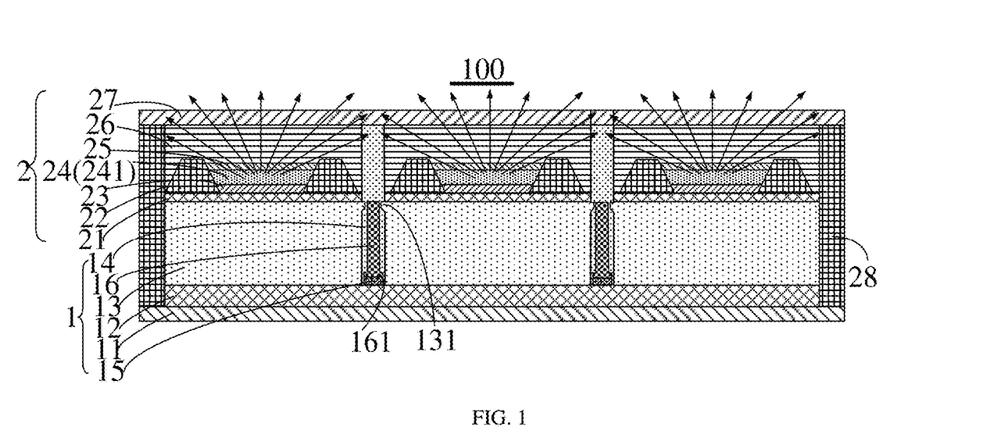
FIG. 1 is a cross-sectional view of a display module in a shared viewing state according to a first embodiment of the present disclosure.
Figure 2:
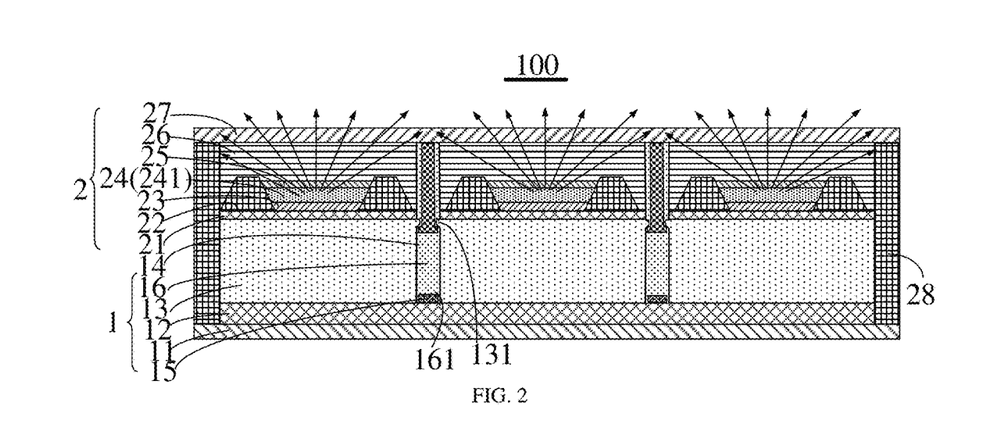
FIG. 2 is a cross-sectional view of the display module shown in FIG. 1, in an anti-beeping state.
Figure 3:
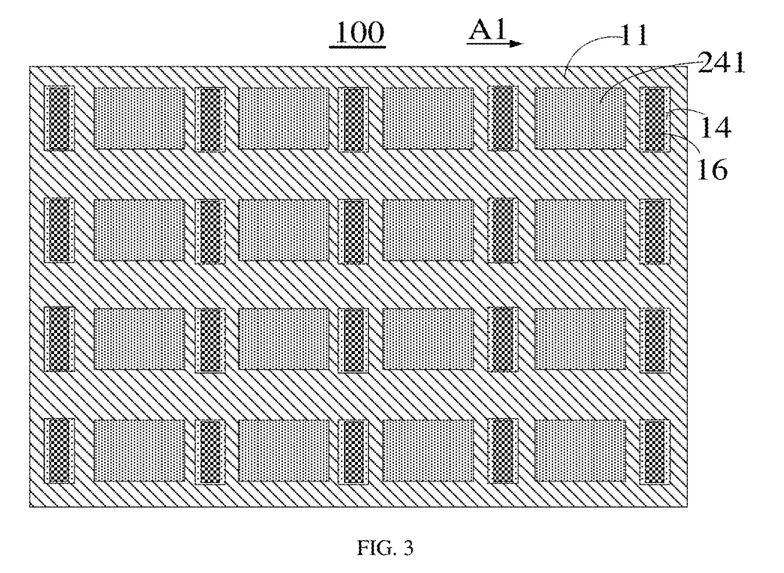
FIG. 3 is a top view of the display module shown in FIG. 1 according to a first implementation of the present disclosure.
Figure 4:
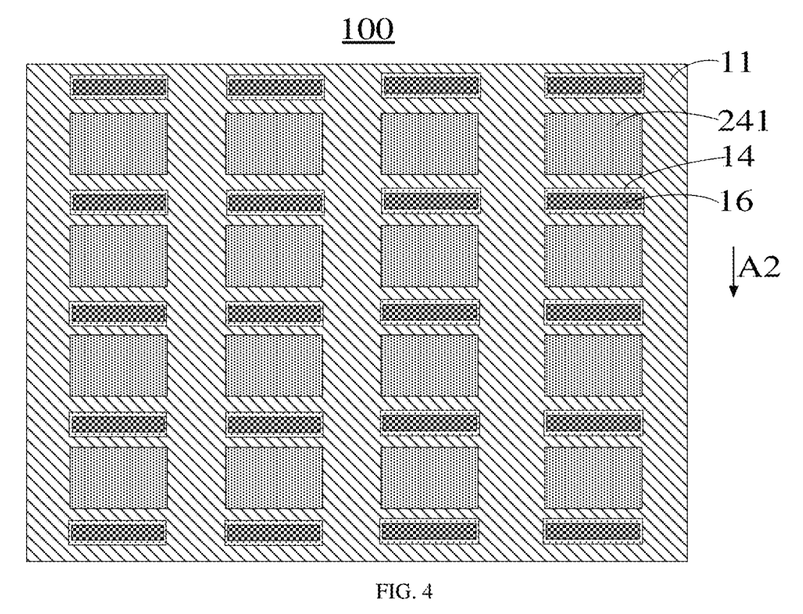
FIG. 4 is a top view of the display module shown in FIG. 1 according to a second implementation of the present disclosure.
Figure 5:
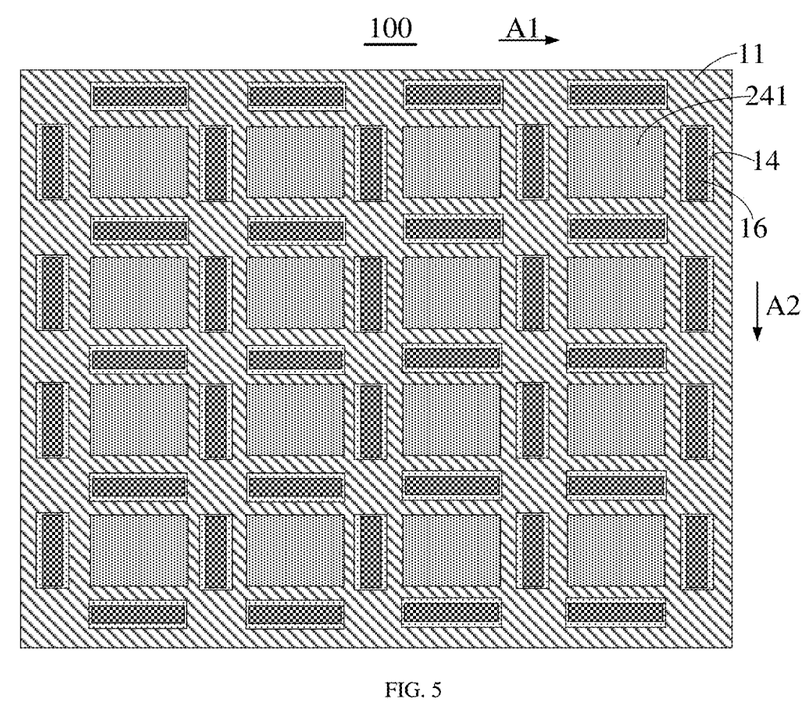
FIG. 5 is a top view of the display module shown in FIG. 1 according to a third implementation of the present disclosure.
Figure 6:
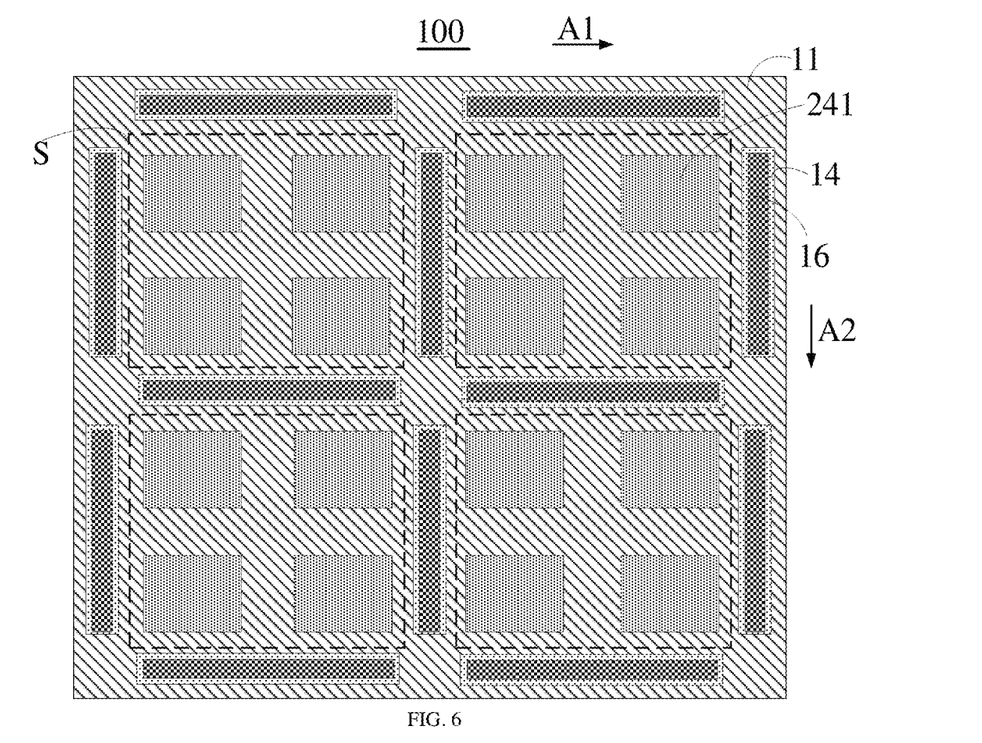
FIG. 6 is a top view of the display module shown in FIG. 1 according to a fourth implementation of the present disclosure.

As shown in FIG. 1 to FIG. 6, FIG. 1 is a cross-sectional view of a display module in a shared viewing state according to a first embodiment of the present disclosure; FIG. 2 is a cross-sectional view of the display module shown in FIG. 1, in an anti-beeping state; FIG. 3 is a top view of the display module shown in FIG. 1 according to a first implementation of the present disclosure; FIG. 4 is a top view of the display module shown in FIG. 1 according to a second implementation of the present disclosure; FIG. 5 is a top view of the display module shown in FIG. 1 according to a third implementation of the present disclosure; FIG. 6 is a top view of the display module shown in FIG. 1 according to a fourth implementation of the present disclosure.

As shown in FIGS. 1 and 2, the present disclosure provides a display module 100, the display module 100 includes an anti-peeping assembly 1 and a display assembly 2. The anti-peeping assembly 1 includes a substrate 11, a first driving circuit layer 12, and a base layer 13 that are sequentially laminated. The display assembly 2 includes a second driving circuit layer 21, a pixel defining layer 22, a first electrode layer 23, a light-emitting layer 24, and a second electrode layer 25, which are sequentially arranged on a side of the base layer 13 away from the substrate 11. The first electrode layer 23 may be an anode layer, and the second electrode layer 25 may be a cathode layer. Alternatively, the first electrode layer 23 may be the cathode layer, and the second electrode layer 25 may be the anode layer. The light-emitting layer 24 includes a plurality of pixel units 241 that are spaced apart from each other. The plurality of pixel units 241 may emit light of any color, such as red, blue, green, and so on.

In the present disclosure, the base layer 13 is arranged with an anti-peeping channel 14 at a position corresponding to a region between two adjacent pixel units 241 of a portion of the plurality of pixel units 241. The anti-peeping channel 14 extends through the base layer 13 and the display assembly 2. The anti-peeping assembly 1 further includes a first electromagnet 15 and a black magnetic member 16. The first electromagnet 15 is arranged in the anti-peeping channel 14 and is electrically connected with the first driving circuit layer 12. The first driving circuit layer 12 is configured to apply a current signal to the first electromagnet 15. The black magnetic member 16 is arranged in the anti-peeping channel 14, and the black magnetic member 16 is configured to move in the anti-peeping channel 14, according to the current signal that is applied by the first driving circuit layer 12 to the first electromagnet 15, to control a viewing angle of the display module 100.

It can be understood that, in the present disclosure, the anti-peeping assembly 1 is arranged on a side of the display assembly 2; the first driving circuit layer 12, the anti-peeping channel 14, the first electromagnet 15, and the black magnetic member 16 are arranged in the anti-peeping assembly 1; and the first driving circuit layer 12 applies the current signal to the first electromagnet 15. In this way, the first electromagnet 15 generates a magnetic field according to the principle of electromagnetic induction, such that the black magnetic member 16 moves, due to the magnetic field generated by the first electromagnet 15, within the anti-peeping channel 14. Since the black magnetic member 16 is black and moves within the anti-peeping channel 14, when the black magnetic member 16 is located, due to the magnetic field, in a portion of the anti-peeping channel 14 corresponding to the base layer 13, the light emitted by the plurality of pixel units 241 is completely exposed, and the viewing angle of the display module 100 is larger, such that the shared viewing state is achieved. When the black magnetic member 16 moves to another portion of the anti-peeping channel 14 corresponding to the display module 2, the black magnetic member 16 may block or absorb at least a portion of the light, which is emitted by the pixel units 241 corresponding to the black magnetic member 16, such that the viewing angle of the display module 100 is changed, the viewing angle of the display module 100 is reduced. In this way, a displaying state of the display module 100 is switched from the shared viewing state to the anti-peeping state. According to the above method, the display module 100 achieves the conversion between the shared viewing state and the anti-peeping state, and the anti-peeping film layer is omitted from a light-emitting surface of the display module 100, such that a displaying brightness is not lost. While the conversion between the shared viewing state and the anti-peeping state is achieved, the displaying brightness of the display module 100 is also ensured, a displaying performance of the display module 100 is improved.

Specifically, the display module 100 in the present disclosure is an OLED display module. The display module 100 further includes an encapsulation layer 26 and a cover plate 27. The encapsulation layer 26 is disposed on a side of the second electrode layer 25 away from the light-emitting layer 24. The encapsulation layer 26 is made of a transparent material. The cover plate 27 is disposed on a side of the encapsulation layer 26 away from the second electrode layer 25. An end of the anti-peeping channel 14 away from the first driving circuit layer 12 extends to reach a surface of the encapsulation layer 26 away from the second electrode layer 25. That is, the anti-peeping channel 14 extends through the encapsulation layer 26. The first electromagnet 15 is disposed on a surface of the first driving circuit layer 12 near the base layer 13.

In the present embodiment, when the first driving circuit layer 12 applies the first current signal to the first electromagnet 15, the black magnetic member 16 is configured to be attracted by the first electromagnet 15, enabling the black magnetic member 16 to be disposed within the portion of the anti-peeping channel 14 corresponding to the base layer 13. In this way, the light of the plurality of pixel units 241 is completely exposed, the viewing angle of the display module 100 is maximized, and the display module 100 is in the shared viewing state. When the first driving circuit layer 12 applies a second current signal to the first electromagnet 15, the black magnetic member 16 is further configured to be repelled by the first electromagnet 15, enabling the black magnetic member 16 to move toward the portion of the anti-peeping channel 14 corresponding to the display assembly 2, such that the light emitted by the plurality of pixel units 241 is at least partially blocked by the black magnetic member 16. Specifically, light emitted by a side of each pixel unit 241 is at least partially blocked by the corresponding black magnetic member 16, such that the viewing angle of the display module 100 is reduced, and the display module 100 is switched to be in the anti-peeping state.

Specifically, as shown in FIG. 1, the first driving circuit layer 12 applies the first current signal to the first electromagnet 15. The first current signal may be a forward current. The first electromagnet 15 generates the first magnetic field under the first current signal according to the principle of electromagnetic induction. In this case, the black magnetic member 16 is attracted to the first electromagnet 15 due to the first magnetic field generated by the first electromagnet 15. The black magnetic member 16 is attracted to come into contact with the first electromagnet 15 disposed on the surface of the first driving circuit layer 12 away from the substrate 11. In this way, the black magnetic member 16 is disposed in the portion of the anti-peeping channel 14 corresponding to the base layer 13, and the display module 100 is in the shared viewing state. As shown in FIG. 2, the first driving circuit layer 12 applies the second current signal to the first electromagnet 15, and the second current signal may be a reverse current. The first electromagnet 15 generates a second magnetic field under the second current signal according to the principle of electromagnetic induction. Polarities of the second magnetic field is opposite to polarities of the first magnetic field. In this case, the black magnetic member 16 is repelled by the first electromagnet 15 due to the second magnetic field generated by the first electromagnet. The black magnetic member 16 is repelled by the first electromagnet 15 to move to a side away from the substrate 11 in the anti-peeping channel 14. In this way, the black magnetic member 16 is at least partially disposed in the portion of the anti-peeping channel 14 that corresponds to the display assembly 2. Therefore, the light emitted from the pixel units 241 corresponding to the black magnetic member 16 is partially blocked, the viewing angle of the display module 100 is decreased, and the display module 100 is in the anti-peeping state.

In the present embodiment, a value of the current applied by the first driving circuit layer 12 to the first electromagnet 15 may be adjusted to adjust a distance for which the black magnetic member 16 in the anti-peeping channel 14 moves to the side away from the substrate 11. In this way, the amount of light, which is emitted from the pixel units 241 and is blocked by the black magnetic member 16, is adjusted, such that the viewing angle of the display module 100 is adjusted. Therefore, the viewing angle of view of the display module 100 can be adjusted arbitrarily, meeting various usage requirements. For example, as a current value of the second current signal applied to the first electromagnet 15 by the first driving circuit layer 12 increases, the second magnetic field generated by the first solenoid 15 is stronger, a repulsive force that the first electromagnet 15 repels the black magnetic member 16 is larger, a stronger repulsive effect is achieved, the distance for which the black magnetic member 16 moves to the side away from the substrate 11 is longer, the amount of light which is emitted from the pixel units 241 and is blocked by the black magnetic member 16 is larger, and the viewing angle of the display module 100 is smaller. Therefore, the anti-peeping effect is stronger.

In other implementations, the first current signal applied by the first driving circuit layer 12 to the first electromagnet 15 may be the reverse current, and the second current signal may be the forward current. The black magnetic member 16 may be repelled by the first electromagnet 15 when the first driving circuit layer 12 applies the first current signal to the first electromagnet 15, such that the light emitted from the pixel units 241 is at least partially blocked. When the first driving circuit layer 12 applies the second current signal to the first electromagnet 15, the black magnetic member 16 may be attracted by the first electromagnet 15 and move toward the portion of the anti-peeping channel 14 corresponding to the base layer 13. In this way, the viewing angle of the display module 100 is adjusted, and the conversion between the shared viewing state and the anti-peeping state of the display module 100 is achieved.

As shown in FIGS. 1 and 2, a first limiting member 131 is arranged on a channel sidewall of the anti-peeping channel 14. The first limiting member 131 is disposed on a sidewall of the portion of the anti-peeping channel 14 corresponding to the base layer 13. A second limiting member 161 is arranged at an end of the black magnetic member 16 near the substrate 11. When the black magnetic member 16 moves in the direction towards the cover 27, the first limiting member 131 is configured to be in contact with and to mate with the second limiting member 161 to limit the end of the black magnetic member 16 near the substrate 11 in the portion of the anti-peeping channel 14 corresponding to the base layer 13.

Specifically, in the present embodiment, the first limiting member 131 is disposed on a sidewall of the portion of the anti-peeping channel 14 corresponding to the end of the base layer 13 away from the substrate 11. The first limiting member 131 is a projection arranged on the sidewall of the anti-peeping channel 14. The second limiting member 161 is a projection arranged on the sidewall of the end of the black magnetic member 16 near the substrate 11. When an end of the black magnetic member 16 near the substrate 11 moves to the end of the base layer 13 away from the substrate 11, the first limiting member 131 of the base layer 13 is in contact with the second limiting member 161 of the black magnetic member 16. The first limiting member 131 blocks the black magnetic member 16 and limits a position of the black magnetic member 16. The end of the black magnetic member 16 near the substrate 11 is limited to the portion of the anti-peeping channel 14 corresponding to the substrate 13, preventing the entire black magnetic member 16 from completely moving to be disposed in the portion of the anti-peeping channel 14 corresponding to the display assembly 2, such that the end of the black magnetic member 16 away from the substrate 11 is prevented from being in contact with the cover plate 27, and the cover plate 27 is prevented from being deformed. In addition, since the black magnetic member 16 is prevented from completely moving to be disposed in the portion of the anti-peeping channel 14 corresponding to the display assembly 2, the end of the black magnetic member 16 near the substrate 11 can block a portion of the light, which is emitted from the pixel units 241 and is propagating near the base layer 13, such that the anti-peeping effect is not affected.

As shown in FIG. 1, in the present embodiment, the first limiting member 131 and the base layer 13 are configured as a one-piece structure. The second limiting member 161 and the black magnetic member 16 are configured as a one-piece structure. Arranging the first limiting member 131 and the second limiting member 161 ensures the effect of adjusting, by the black magnetic member 16, the viewing angle of the display module 100, and the anti-peeping effect is better.

In other embodiments, the first limiting member 131 of the base layer 13 may be disposed at other locations. For example, the first limiting member 131 may be disposed at a middle or a mid-upper portion of a sidewall of the portion of the anti-peeping channel 14 corresponding to the base layer 13. The second limiting member 161 may alternatively be disposed at the other portions of the black magnetic member 16. For example, the second limiting member 161 is disposed at a middle portion or a mid-lower portion of the sidewall of the black magnetic member 16. In this way, the first limiting member 131 and the second limiting member 161 are enabled to be in contact with and to be mated with each other, such that the black magnetic member 16 is limited. Alternatively, the first limiting member 131 and the base layer 13 may not be configured as the one-piece structure. The first limiting member 131 may be an independent structural member disposed on the sidewall of the portion of the anti-peeping channel 14 corresponding to the base layer 13, and the first limiting member 131 is fixedly connected to the base layer 13. The second limiting member 161 and the black magnetic member 16 may not be configured as the one-piece structure. The second limiting member 161 may be an independent structural member disposed on the sidewall of the black magnetic member 16, and the second limiting member 161 is fixedly connected to the black magnetic member 16. In this way, the first limiting member 131 limits the black magnetic member 16. The first limiting member 131 and the second limiting member 161 may alternatively be configured as structures other than the projections. Alternatively, the first limiting member 131 and the second limiting member 161 may be omitted.

In some embodiments, as shown in FIG. 1, when the first electromagnet 15 attracts the black magnetic member 16 so that to enable the end of the black magnetic member 16 near the substrate 11 to be in contact with the first electromagnet 15, a surface of the end of the black magnetic member 16 away from the substrate 11 is flushed with a surface of the end of the base layer 13 away from the substrate 11. That is, a sum of a height of the black magnetic member 16 and a height of the first electromagnet 15 is equal to a height of the base layer 13. It is understood that when the black magnetic member 16 is attracted to be in contact with the first electromagnet 15, the surface of the end of the black magnetic member 16 away from the substrate 11 is flushed with the surface of the end of the base layer 13 away from the substrate 11. In this way, it is ensured that the black magnetic member 16 is completely disposed inside the portion of the anti-peeping channel 14 corresponding to the base layer 13, and it is better ensured that the light emitted from the pixel units 241 can be completely exposed. In this way, the display module 100 may achieve the shared viewing state optimally, preventing any portion of the light emitted from the pixel units 241 from being blocked by the black magnetic member 16 due to the height of the black magnetic member 16 being excessively high, such that the shared viewing state of the display module 100 is not affected. In addition, the surface of the end of the black magnetic member 16 away from the substrate 11 is flushed with the surface of the end of the base layer 13 away from the substrate 11. When the first electromagnet 15 generates the second magnetic field and the black magnetic member 16 is repelled by the first electromagnet 15 to move toward the end near the cover plate 27, the end of the black magnetic member 16 away from the substrate 11 may quickly move to be disposed inside the portion of the anti-peeping channel 14 corresponding to the display assembly 2 and block a portion of the light of the pixel units 241, such that the viewing angle of the display module 100 is adjusted. That is, the display module 100 may be quickly switched from the shared viewing state to the anti-peeping state, a switching efficiency is improved, and the usage requirements may be satisfied better.

A certain gap is defined between the sidewall of the black magnetic member 16 and the sidewall of the anti-peeping channel 14. That is, the sidewall of the black magnetic member 16 is spaced apart from the sidewall of the anti-peeping channel 14, such that a friction between the sidewall of the black magnetic member 16 and the sidewall of the anti-peeping channel 14 is reduced effectively. In this way, it is ensured that the black magnetic member 16 can smoothly move inside the anti-peeping channel 14, ensuring the conversion effect between the shared viewing state and the anti-peeping state of the display module 100.

Further, in the present embodiment, the anti-peeping channel 14 is filled with a lubricating fluid. The lubricating fluid may be hydrophobic and insulating. It can be understood that, as the lubricating fluid fills the anti-peeping channel 14, the lubricating fluid further reduces the friction between the black magnetic member 16 and the sidewall of the anti-peeping channel 14 more effectively, and the conversion between the shared viewing state and the anti-peeping state can be achieved better. In addition, since the lubricating fluid is hydrophobic and insulating, interaction between the black magnetic member 16 and the first electromagnet 15 is not affected. In addition, the hydrophobic and insulating lubricating fluid effectively prevents external harmful substances, such as water vapor, from entering the anti-peeping channel 14 and further entering the light-emitting layer 24 of the display module 100 through the anti-peeping channel 14. In this way, a risk of failure of the display module 100 is reduced effectively.

As shown in FIGS. 1 and 2, the display module 100 further includes an edge sealing adhesive 28. The edge sealing adhesive 28 is disposed between the cover plate 27 and the substrate 11. Two ends of the edge sealing adhesive 28 are connected to the cover plate 27 and the substrate 11, respectively. The edge sealing adhesive 28 is disposed along a circumferential direction of the display module 100. Specifically, the edge sealing adhesive 28 is disposed to surround a circumferential direction of the base layer 13 and the display assembly 2. In the present embodiment, the edge sealing adhesive 28 is hydrophobic. It is understood that the hydrophobicity of the edge sealing adhesive 28 effectively prevents external substances, such as water vapor, from entering the display module 100 and further entering the light0emitting layer 24, such that failure of the display module 100 is prevented, and displaying performance is improved.

In the present embodiment, taking the encapsulation layer 26 to encapsulate the display assembly 2 can already effectively isolate water vapor, oxygen and other harmful substances, which may reduce the performance of the display module 100. Furthermore, the hydrophobic edge sealing adhesive 28 is further arranged, and the anti-peeping channel 14 is filled with the hydrophobic and insulating lubricating fluid. In this way, the isolation against the water vapor and other substances is better, the risk of failure of the display module 100 is further reduced, and the displaying performance of the display module 100 is further improved. In other embodiments, the anti-peeping channel 14 may not be filled with the lubricating fluid.

As shown in FIGS. 3 to 6, a cross section of the display module 100 is rectangular. The display module 100 includes a plurality of pixel units 241, a plurality of anti-peeping channels 14, and a plurality of black magnetic members 16. Each pixel unit 241 may be rectangular. The plurality of pixel units 241 of the display module 100 are distributed to form an array. The plurality of pixel units 241 may have a same size or different sizes. Each black magnetic member 16 is column shaped. Specifically, the black magnetic member 16 is in a shape of a quadrangular column. The black magnetic member 16 may be a black permanent magnet.

As shown in FIG. 3, in an embodiment, in a first direction A1, the anti-peeping channels 14 are arranged at positions of the base layer 13 corresponding to regions between two adjacent pixel units 241 and at positions of the base layer 13 corresponding to regions between pixel units 241 and edges of the substrate 11. Each anti-peeping channel 14 extends through the base layer 13 and the display assembly 2. One first electromagnet 15 and one black magnetic member 16 are arranged in each anti-peeping channel 14. The first direction A1 may be a length direction of the display module 100. It is understood that, by arranging the anti-peeping channels 14 and the black magnetic members 16 between two adjacent pixel units 241 and between the pixel units 241 and the edges of the substrate 11 in the first direction A1, the light emitted from all of the plurality of pixel units 241 of the display module 100 in the first direction A1 can be at least partially blocked when the black magnetic members 16 move. In this way, the viewing angle of the display module 100 in the first direction A1 is adjusted. Therefore, the conversion between the shared viewing state and the anti-peeping state of the display module 100 in the first direction A1 can be achieved, and specific usage demands of the user can be satisfied.

As shown in FIG. 4, in another embodiment, in a second direction A2, the anti-peeping channels 14 are arranged at positions of the base layer 13 corresponding to regions between two adjacent pixel units 241 and between the pixel units 241 and edges of the substrate 11. Each anti-peeping channel 14 extends through the base layer 13 and the display assembly 2. One first electromagnet 15 and one black magnetic member 16 are arranged in each anti-peeping channel 14. The second direction A2 may be a width direction of the display module 100. Specifically, the second direction A2 may be perpendicular to the first direction A1. It is understood that, by arranging the anti-peeping channels 14 and the black magnetic members 16 between two adjacent pixel units 241 and between the pixel units 241 and the edges of the substrate 11 in the second direction A2, the light emitted from all of the plurality of pixel units 241 of the display module 100 in the second direction A2 can be at least partially blocked when the black magnetic members 16 move. In this way, the viewing angle of the display module 100 in the second direction A2 is adjusted, and the display module 100 can achieve conversion between the shared viewing state and the anti-peeping state in the second direction A2, specific usage demands of the user can be satisfied.

As shown in FIG. 5, in another embodiment, in the first direction A1 and in the second direction A2, anti-peeping channels 14 are arranged on the base layer 13 at positions corresponding to regions between two adjacent pixel units 241 and between the pixel units 241 and the edges of the substrate 11. Each anti-peeping channel 14 extends through the base layer 13 and the display assembly 2. One first electromagnet 15 and one black magnetic member 16 are arranged in each anti-peeping channel 14. That is, for each rectangular pixel unit 241, each of four sides of the rectangular pixel unit 241 corresponds to one anti-peeping channel 14 and one black magnetic member 16. It is understood that, by arranging the anti-peeping channels 14 and the black magnetic members 16 between two adjacent pixel units 241 and between the pixel units 241 and the edges of the substrate 11 in the first direction A1 and the second direction A2, each of four sides of each pixel unit 241 corresponds to one black magnetic member 16. The light emitted from each pixel unit 241 in the first direction A1 and the second direction A2 can be at least partially blocked when the corresponding black magnetic member 16 moves. In this way, the viewing angle of the display module 100 in both the first direction A1 and the second direction A2 can be changed, such that anti-peeping at any position along a circumferential direction of the display module 100 can be achieved. The anti-peeping effect of the display module 100 is better. The display module 100 achieves the conversion between the shared viewing state and the anti-peeping state in both the first direction A1 and the second direction A2, and the displaying performance of the display module 100 is improved.

As shown in FIG. 6, in another embodiment, the display module 100 includes a plurality of pixel regions S that are spaced apart from each other. In each of the plurality of pixel regions S, a plurality of pixel units 241 are arranged and are spaced apart from each other. The anti-peeping channels 14 are arranged on the base layer 13 at positions corresponding to only regions between two adjacent pixel regions S and regions between the pixel regions S and edges of the substrate 11. Each anti-peeping channel 14 extends through the base layer 13 and the display assembly 2. One first electromagnet 15 and one black magnetic member 16 are arranged in each anti-peeping channel 14. The plurality of pixel regions S may include the same number of pixel units 241 or different numbers of pixel units 241. The plurality of pixel regions S may have a same shape and a same size or have different shapes and/or different sizes. It is understood, in the present embodiment, the anti-peeping channels 14 and the black magnetic members 16 are arranged only between adjacent pixel regions S. In this way, the number of first electromagnets 15 and the number of black magnetic members 16 are reduced, the structure of the display module 100 is simplified, and the viewing angle for each of the plurality of pixel regions S is adjusted. Each pixel region S can achieve the conversion between the shared viewing state and the anti-peeping state, such that partitioned anti-peeping effect is achieved. Furthermore, the anti-peeping film is omitted from the light-emitting surface of the display module 100, loss in brightness is avoided, the displaying brightness of the display module 100 is improved, and the displaying performance is improved.

The anti-peeping channels 14 and the black magnetic members 16 may be arranged along only the first direction A1 at the positions between two adjacent pixel regions S and at the positions between the pixel regions S and the edges of the substrate 11. Alternatively, the anti-peeping channels 14 and the black magnetic members 16 may be arranged along only the second direction A2 at the positions between two adjacent pixel regions S and at the positions between the pixel regions S and the edges of the substrate 11. Alternatively, the anti-peeping channels 14 and the black magnetic members 16 may be arranged, along both the first direction A1 and the second direction A2, at the positions between two adjacent pixel regions S and at the positions between the pixel regions S and the edges of the substrate 11. The user may determine the arrangement according to the specific demands. In this way, the plurality of pixel regions S may achieve the anti-peeping effect in the first direction A1 and/or the second direction A2, meeting more usage demands.

In the present embodiment, the first driving circuit layer 12 is configured to apply the current signal to each first electromagnetic 15 independently, to individually control each black magnetic member 16, based on the corresponding current signal, to move in the anti-peeping channel 14. Specifically, the anti-peeping channel 14 and the black magnetic member 16 may be configured according to any of the above embodiments, the first driving circuit layer 12 applies the current signal to each first electromagnetic 15 independently. For example, the first driving circuit layer 12 may apply the first current signal to a portion of the plurality of first electromagnets 15 and apply a second current signal to another portion of the plurality of first electromagnets 15. In this way, a portion of the black magnetic members 16 are disposed within the portion of the anti-peeping channels 14 corresponding to the base layer 13, and light emitted from the corresponding pixel units 241 is completely exposed, the corresponding pixel units 241 are in the shared viewing state. Another portion of the black magnetic members 16 are repelled by the first electromagnets 15 to move toward the side near the cover plate 27, such that the light emitted from the corresponding pixel units 241 are at least partially blocked. Therefore, the viewing angle at the corresponding position is reduced, and the corresponding pixel units 241 are in the anti-peeping state.

It is understood that, since the first driving circuit layer 12 applies the current signal to each first electromagnet 15 independently to independently control movement of each black magnetic member 16, the viewing angle of each of the plurality of pixel units 241 or each of the plurality of pixel areas S of the display module 100 can be adjusted independently, such that partitioned anti-peeping effect can be achieved, satisfying various anti-peeping demands of the user. The display module 100 may be applied widely, and application scenes may be more diverse.

In other embodiments, the first driving circuit layer 12 may apply the current signal to the plurality of first electromagnets 15 simultaneously to simultaneously control the plurality of black magnetic members 16. In this way, the plurality of black magnetic members 16 move synchronously to achieve the conversion between the shared viewing state and the anti-peeping state. Each pixel unit 241 may be in any shape, such as circular, elliptical, rhombic, trapezoidal, triangular, pentagonal, hexagonal, octagonal, and so on. The plurality of pixel units 241 of the light-emitting layer 24 of the display module 100 may not be arranged to form the array and may be distributed randomly. The anti-peeping channel 14 and the black magnetic member 16 may be configured in any shape corresponding to the shape of the pixel unit 241, such as cylindrical, pentagonal, elliptical, and so on. The anti-peeping channels 14 and the black magnetic members 16 may be arranged at the positions between two adjacent pixel units 241 or the positions between two adjacent pixel regions S, along any direction other than the first direction A1 and the second direction A2. In this way, the anti-peeping effect in a particular direction or a plurality of directions can be achieved. Specific arrangement of the anti-peeping channels 14 and the black magnetic members 16 may be determined according to the shape of the pixel unit 241 and the actual demands, which will not be limited by the present disclosure.

Figure 7:
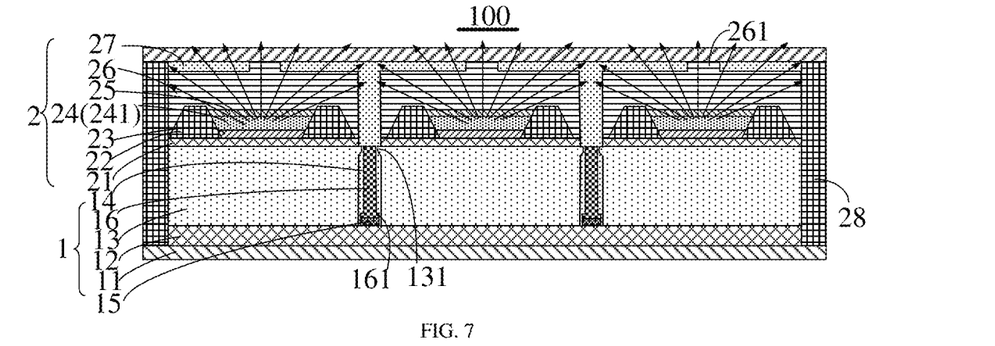
FIG. 7 is a cross-sectional view of a display module according to a second embodiment of the present disclosure.

As shown in FIG. 7, FIG. 7 is a cross-sectional view of the display module according to a second embodiment of the present disclosure.

As shown in FIG. 7, the present embodiment provides another display module 100. In the present embodiment, a plurality of support walls 261 are arranged on a surface of the encapsulation layer 26 near the cover plate 27 and are spaced apart from each other. Specifically, surfaces of the support walls 261 away from the base layer 13 is in contact with the cover plate 27. The support walls 261 support the cover plate 27. The support walls 261 misalign with the anti-peeping channels 14. As shown in FIG. 7, in the present embodiment, each support wall 261 is a projection arranged on the surface of the encapsulation layer 26 away from the substrate 11. The support walls 261 and the encapsulation layer 26 are configured as a one-piece and integral structure. The support wall 261 is disposed between two adjacent anti-peeping channels 14. The plurality of the support walls 261 may be uniformly distributed or randomly distributed. In other embodiments, the support walls 261 may not be integrally formed with the encapsulation layer 26. The support wall 261 may be an independent structural member fixedly attached to the surface of the encapsulation layer 26 away from the substrate 11.

Further, in the present embodiment, a lubricating fluid is filled in a gap between two adjacent support walls 261 and between the two support wall 261 and the edge sealing adhesive 28. The lubricating fluid is hydrophobic and insulating. It is understood that the lubricating fluid is filled between the two adjacent support walls 261 and between the support wall 261 and the edge sealing adhesive 28, the lubricating fluid covers the surface of the encapsulation layer 26 away from the substrate 11, and the circumference of the display module 100 is sealed by the hydrophobic edge sealing adhesive 28, such that the lubricating fluid is prevented from leaking. Furthermore, the edge sealing adhesive 28 serves as a first barrier to isolate water and oxygen substances. The hydrophobic and insulating lubricating fluid, which covers the surface of the encapsulation layer 26 away from the substrate 11, serves as a second barrier to isolate water and oxygen substances. The encapsulation layer 26 serves as a third barrier to isolate the water and oxygen substances. The above three barriers for isolating the water and oxygen substances operate cooperatively, further improving weather resistance of the display module 100, and the water and oxygen substances are more effectively prevented from entering the light-emitting layer 24 of the display module 100, such that the risk of failure of the display module 100 is reduced, and the displaying performance is improved. Moreover, the support walls 261 support the cover plate 27, and the support walls 261 perform the supporting function, such that the cover plate 27 is effectively prevented from being deformed, and the structural strength of the display module 100 is improved.

In the present embodiment, the rest components of the display module 100 is the same as those in the first embodiment of the display module 100, and will not be repeated herein.

Figure 8:
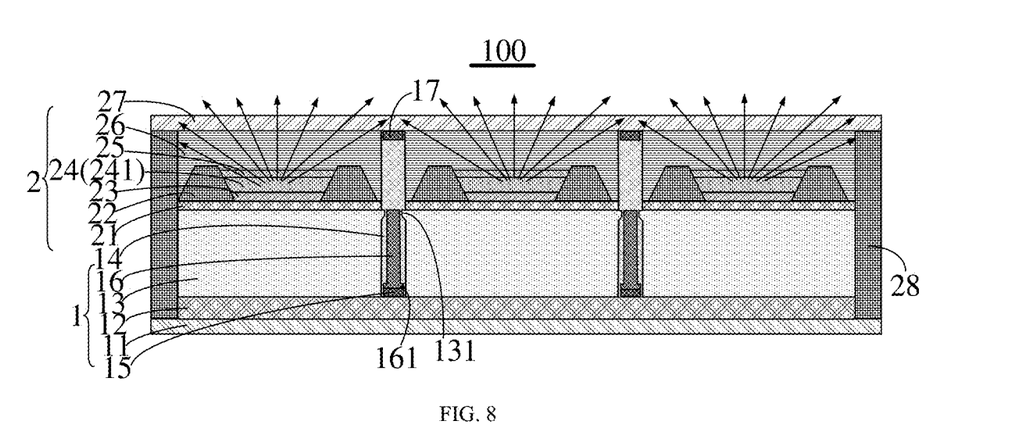
FIG. 8 is a cross-sectional view of a display module according to a third embodiment of the present disclosure.

As shown in FIG. 8, FIG. 8 is a cross-sectional view of the display module according to a third embodiment of the present disclosure.

As shown in FIG. 8, the present embodiment provides another display module 100. In the present embodiment, the display module 100 further includes a second electromagnet 17. The second electromagnet 17 is disposed in the anti-peeping channel 14. Specifically, the second electromagnet 17 is disposed corresponding to the first electromagnet 15 and disposed on a surface of the cover plate 27 near the encapsulation layer 26. When the first driving circuit layer 12 applies the first current signal to the first electromagnet 15, the black magnetic member 16 is attracted to the first electromagnet 15 and is repelled by the second electromagnet 17, such that the black magnetic member 16 is disposed in the portion of the anti-peeping channel 14 corresponding to the base layer 13. Specifically, the end of the black magnetic member 16 near the substrate 11 is in magnetic contact with the first electromagnet 15, such that the light emitted from the pixel unit 241 is completely exposed, the viewing angle of the display module 100 is maximized, and the display module 100 is in the shared viewing state. When the first driving circuit layer 12 applies the second current signal to the first electromagnet 15, the first electromagnet 15 repels the black magnetic member 16, the second electromagnet 17 attracts the black magnetic member 16. The black magnetic member 16 moves, due to a cooperative action of the first electromagnet 15 and the second electromagnet 17, toward the side near the cover plate 27 in the anti-peeping channel 14. In this way, the light emitted from the pixel unit 241 is at least partially blocked by the black magnetic member 16, the viewing angle of the display module 100 is reduced, and the display module 100 is switched to the anti-peeping state.

It is understood that, in the present embodiment, the second electromagnet 17 is disposed on the surface of the cover plate 27 near the encapsulation layer 26 and is corresponding to the first electromagnet 15. The first electromagnet 15 and the second electromagnet 17, due to the current signal applied by the first driving circuit layer 12, apply a force in a same direction to the black magnetic member 16. In this way, the black magnetic member 16 is subjected to a greater force in the same direction. The black magnetic member 16 moves faster in the anti-peeping channel 14 due to the cooperative action of the first electromagnet 15 and the second electromagnet 17. Therefore, a response speed of the black magnetic member 16 is increased effectively. In this way, a speed of the display module 100 switching between the shared viewing state and the anti-peeping state is increased, the displaying performance of the display module 100 is improved, and the usage demands are satisfied more efficiently.

In the present embodiment, the rest components of the display module 100 are the same as those in the first embodiment of the display module 100, and will not be repeated herein.

In other embodiments, the display module 100 may include both the support walls 261 in the second embodiment and the second electromagnet 17 in the third embodiment. While the response speed of the black magnetic member 16 is increased and the speed of the display module 100 switching between the shared viewing state and the anti-peeping state, the external water and oxygen substances are isolated more effectively. The risk that the water and oxygen enters the light-emitting layer 24 of the display module 100 to cause failure of the display module 100 is reduced, and the displaying performance of the display module is improved.

Figure 9:
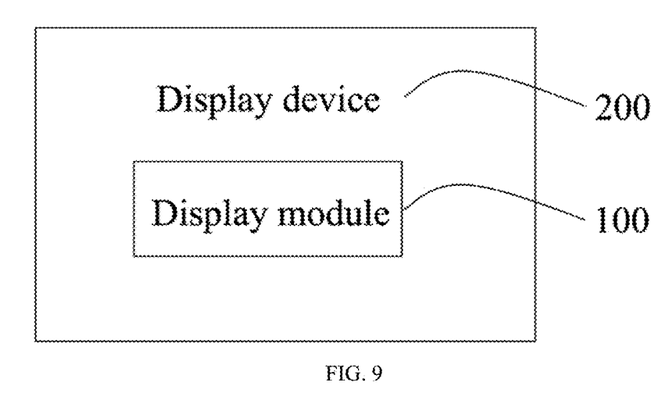
FIG. 9 is a structural schematic diagram of a display device according to an embodiment of the present disclosure.

FIG. 9 is a structural schematic diagram of the display device according to an embodiment of the present disclosure.

As shown in FIG. 9, the present disclosure further provides a display device 200. The display device 200 includes the display module 100 in any of the above embodiments. The display device 200 may further include other structural members, such as a frame (not shown in the drawings).

The above description shows only embodiments of the present disclosure, and is not intended to limit the scope of the present disclosure. Any equivalent structural or equivalent process transformation performed based on the contents of the specification and the accompanying drawings of the present disclosure, applied directly or indirectly in other related technical fields, shall all be included in the scope of the present disclosure.

What is claimed is:

1. A display module, comprising:
   an anti-peeping assembly, comprising: a substrate, a first driving circuit layer, and a base layer that are sequentially laminated;
   a display assembly, comprising: a second driving circuit layer, a pixel defining layer, a first electrode layer, a light-emitting layer, and a second electrode layer that are sequentially disposed on a side of the base layer away from the substrate; wherein, the light-emitting layer comprises a plurality of pixel units that are spaced apart from each other;
   wherein, an anti-peeping channel is arranged on the base layer at least at a position corresponding to a region between two adjacent pixel units of a portion of the plurality of pixel units, the anti-peeping channel extends through the base layer and the display assembly;
   the anti-peeping assembly further comprises a first electromagnet and a black magnetic member, the first electromagnet is arranged in the anti-peeping channel and is electrically connected to the first driving circuit layer, the first driving circuit layer is configured to apply a current signal to the first electromagnet;
   the black magnetic member is arranged in the anti-peeping channel and is configured to move, based on the current signal, in the anti-peeping channel to control a viewing angle of the display module.

2. The display module according to claim 1, wherein, the display module further comprises an encapsulation layer and a cover plate, the encapsulation layer is disposed on a side of the second electrode layer away from the light-emitting layer; the cover plate is disposed on a side of the encapsulation layer away from the second electrode layer; an end of the anti-peeping channel away from the first driving circuit layer extends to reach the surface of the encapsulation layer away from the second electrode layer; the first electromagnet is disposed on a surface of the first driving circuit layer near the base layer;

the black magnetic member is configured to be attracted, in response to the first driving circuit layer applying the first current signal to the first electromagnet, to the first electromagnet to be disposed in a portion of the anti-peeping channel corresponding to the base layer to enable light emitted from the pixel units to be fully exposed; and the black magnetic member is configured to be repelled, in response to the first driving circuit layer applying a second current signal to the first electromagnet, by the first electromagnet to move toward a portion of the anti-peeping channel corresponding to the display assembly to block at least a portion of the light emitted from the pixel units.

3. The display module according to claim 2, wherein, the display module further comprises a second electromagnet, the second electromagnet is arranged in the anti-peeping channel, the second electromagnet is disposed corresponding to the first electromagnet and on a surface of the cover plate near the encapsulation layer;

in response to the first driving circuit layer applying the first current signal to the first electromagnet, the black magnetic member is configured to be attracted to the first electromagnet and repelled by the second electromagnet to be disposed in the portion of the anti-peeping channel corresponding to the base layer to enable the light emitted from the pixel units to be fully exposed; and in response to the first driving circuit layer applying the second current signal to the first electromagnet, the black magnetic member is configured to be repelled by the first electromagnet and attracted by the second electromagnet to move toward the portion of the anti-peeping channel corresponding to the display assembly to block at least a portion of the light emitted from the pixel units.

4. The display module according to claim 3, wherein, when the black magnetic member is attracted to the first electromagnet, an end of the black magnetic member near the substrate is in contact with the first electromagnet, and the other end of the black magnetic member away from the substrate is flushed with a surface of the base layer away from the substrate; and a sum of a height of the black magnetic member and a height of the first electromagnet is equal to a height of the base layer.

5. The display module according to claim 2, wherein, a first limiting member is arranged on a channel sidewall of the anti-peeping channel, the first limiting member is disposed at the portion of the anti-peeping channel corresponding to the base layer; a second limiting member is arranged on an end of the black magnetic member near the substrate;

when the black magnetic member moves in a direction approaching the cover plate, the first limiting member is configured to be in contact with and mated with the second limiting member to limit the end of the black magnetic member near the substrate to be located in the portion of the anti-peeping channel corresponding to the base layer.

6. The display module according to claim 2, wherein, the anti-peeping channel is filled with a lubricating fluid, the lubricating fluid is hydrophobic and insulating;

the display module further comprises an edge sealing adhesive, the edge sealing adhesive is disposed between the cover plate and the substrate, two ends of the edge sealing adhesive are connected to the cover plate and the substrate respectively, the edge sealing adhesive is disposed along a circumferential direction of the display module, and the edge sealing adhesive is hydrophobic.

7. The display module according to claim 6, wherein, a plurality of support walls are arranged on a surface of the encapsulation layer near the cover plate and are spaced apart from each other, the plurality of support walls are in contact with the cover plate; each support wall is misaligned with the anti-peeping channel;

the lubricating fluid is further filled between two adjacent support walls of the plurality of support walls and between the support walls and the edge sealing adhesive, the lubricating fluid is hydrophobic and insulating.

8. The display module according to claim 1, wherein, in a first direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

9. The display module according to claim 1, wherein, in a second direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

10. The display module according to claim 1, wherein, in a first direction and in a second direction, in addition to the anti-peeping channel arranged at the position between the two adjacent pixel units, a plurality of other anti-peeping channels are arranged on the base layer at positions between the pixel units and edges of the substrate, one first electromagnet and one black magnetic member are arranged in each anti-peeping channel.

11. The display module according to claim 10, wherein, for each of the plurality of pixel units, each side of the pixel unit corresponds to one anti-peeping channel.

12. The display module according to claim 1, wherein, the display module comprises a plurality of pixel regions that are spaced apart from each other, each pixel region comprises more than one pixel units of the plurality of pixel units, the more than one pixel units are spaced apart from each other; the anti-peeping channel on the base layer is located at a position corresponding to a region between two adjacent pixel regions, one first electromagnet and one black magnetic member are arranged in each anti-peeping channel.

13. The display module according to claim 1, wherein, the black magnetic member is in columnar, the black magnetic member is a black permanent magnet;

the first driving circuit layer is configured to apply the current signal to each first electromagnet independently to independently control each black magnetic member to move in the anti-peeping channel according to the corresponding current signal.

14. A display device, comprising a display module, wherein the display module comprises:

an anti-peeping assembly, comprising: a substrate, a first driving circuit layer, and a base layer that are sequentially laminated;

a display assembly, comprising: a second driving circuit layer, a pixel defining layer, a first electrode layer, a light-emitting layer, and a second electrode layer that are sequentially disposed on a side of the base layer away from the substrate; wherein, the light-emitting layer comprises a plurality of pixel units that are spaced apart from each other;

wherein, an anti-peeping channel is arranged on the base layer at least at a position corresponding to a region between two adjacent pixel units of a portion of the plurality of pixel units, the anti-peeping channel extends through the base layer and the display assembly;

the anti-peeping assembly further comprises a first electromagnet and a black magnetic member, the first electromagnet is arranged in the anti-peeping channel and is electrically connected to the first driving circuit layer, the first driving circuit layer is configured to apply a current signal to the first electromagnet;

the black magnetic member is arranged in the anti-peeping channel and is configured to move, based on the current signal, in the anti-peeping channel to control a viewing angle of the display module.

* * * * *